US012630443B2

(12) United States Patent
Yu et al.

(10) Patent No.: US 12,630,443 B2
(45) Date of Patent: May 19, 2026

(54) NICKEL-COBALT-MANGANESE TERNARY POSITIVE ELECTRODE MATERIAL NANOROD AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 241 days.

(21) Appl. No.: 18/682,113

(22) PCT Filed: Nov. 30, 2022

(86) PCT No.: PCT/CN2022/135661
§ 371 (c)(1),
(2) Date: Feb. 7, 2024

(87) PCT Pub. No.: WO2023/138221
PCT Pub. Date: Jul. 27, 2023

(65) Prior Publication Data
US 2024/0343607 A1 Oct. 17, 2024

(30) Foreign Application Priority Data

Jan. 24, 2022 (CN) .......................... 202210076940.3

(51) Int. Cl.
*H01B 1/08* (2006.01)
*C01G 53/50* (2025.01)
(Continued)

(52) U.S. Cl.
CPC .............. *C01G 53/50* (2013.01); *H01B 1/08* (2013.01); *H01M 4/505* (2013.01); *H01M 4/525* (2013.01);
(Continued)

(58) Field of Classification Search
CPC .. H01B 1/00; H01B 1/08; H01M 4/04; H01M 4/505; H01M 4/525; C01G 53/50
See application file for complete search history.

(56) References Cited

U.S. PATENT DOCUMENTS 10,886,532 B2 * 1/2021 Kim ...................... H01M 4/505
2016/0049642 A1 * 2/2016 Jiang ...................... C01G 53/44
252/182.1

OTHER PUBLICATIONS

Noh et al "Cathode Material with Nanorod Structure-An Application for Advanced High-Energy and Safe Lithium Batteries", dx.doi.org/10.1021/cm4006772 | Chem. Mater. 2013, 25, 2109-2115.*
(Continued)

*Primary Examiner* — Mark Kopec
(74) *Attorney, Agent, or Firm* — Westbridge IP LLC

(57) ABSTRACT

The present application discloses a nickel-cobalt-manganese ternary positive electrode material nanorod and the use thereof. The chemical general formula of the nickel-cobalt-manganese ternary positive electrode material nanorod is $LiNi_{1-x-y-z}Co_xMn_yAl_zO_2$, where $0<x<1$, $0<y<1$, and $0 \le z \le 0.05$; the nickel-cobalt-manganese ternary positive electrode material nanorod has a section diameter of 50-200
(Continued)

nm and a length of 0.1-5 μm. In the present application, a mixed metal salt solution of nickel, cobalt, manganese, aluminum and lithium and 8-hydroxyquinoline are subjected to complex-precipitation to generate a precipitate containing nickel, cobalt, manganese, aluminum and lithium, and then the precipitate is calcined to prepare a ternary positive electrode material nanorod. Unlike traditional processes, no ammonia-nitrogen wastewater is generated in the whole process, and an alcohol used in the process can be directly recovered by means of evaporation and condensation, such that the process is environment-friendly.

9 Claims, 1 Drawing Sheet

(51) Int. Cl.
| | |
|---|---|
| *H01M 4/505* | (2010.01) |
| *H01M 4/525* | (2010.01) |
| *H01M 4/02* | (2006.01) |
| *H01M 10/0525* | (2010.01) |

(52) U.S. Cl.
CPC ...... *C01P 2002/54* (2013.01); *C01P 2004/03* (2013.01); *C01P 2004/16* (2013.01); *C01P 2006/40* (2013.01); *H01M 2004/028* (2013.01); *H01M 10/0525* (2013.01)

(56) References Cited

OTHER PUBLICATIONS

Noh et al "Comparison of Nanorod-Structured Li[Ni0.54Co0.16Mn0.30]O2 with Conventional Cathode Materials for Li-Ion Batteries", ChemSusChem 2014, 7, 245-252.*
English language translation of form PCT/ISA/237 (mailed Feb. 10, 2023).*

* cited by examiner

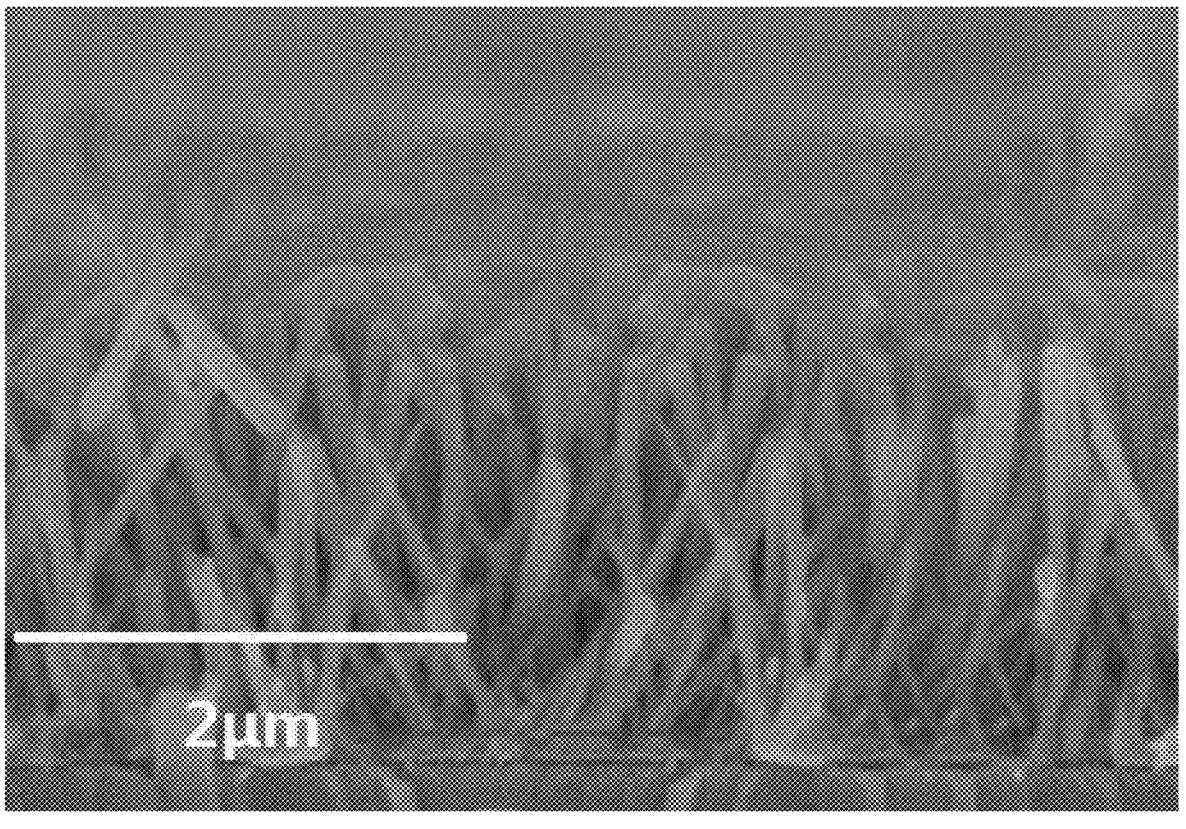

NICKEL-COBALT-MANGANESE TERNARY POSITIVE ELECTRODE MATERIAL NANOROD AND USE THEREOF

TECHNICAL FIELD

The present disclosure belongs to the technical field of lithium-ion batteries (LIBs), and in particular relates to a nickel-cobalt-manganese (NCM) ternary cathode material nanorod and a use thereof.

BACKGROUND

LIBs are widely used in fields such as portable electronic products, electric vehicles, and energy storage systems due to their advantages such as high energy density, low self-discharge, no memory effect, long cycling life, and small environmental pollution. With the increasing market demand for high-performance (such as high energy density) batteries and the continuous popularization of electric vehicles, the market demand for battery cathode materials has presented a rapid growth trend.

In the preparation of a cathode material, it is necessary to prepare a transition metal into a solution for preparing precursor and then subject the solution for preparing the precursor to precipitation reaction with a precipitating agent and ammonia water to obtain the precursor, which results in a large amount of ammonia and nitrogen wastewater; and the prepared precursor needs to be sintered with a lithium source to obtain a cathode material. The overall process is longer, and causes serious resource waste and heavier pollution.

SUMMARY

The following is a summary of subject matters described in details herein. This summary is not intended to limit the protection scope the claims.

The present disclosure is intended to solve at least one of the above-described technical problems existing in prior art. In view of this, the present disclosure provides an NCM ternary cathode material nanorod and a use thereof.

According to an aspect of the present disclosure, an NCM ternary cathode material nanorod is provided, where the NCM ternary cathode material nanorod has a chemical general formula of $LiNi_{1-x-y-z}Co_xMn_yAl_zO_2$, where $0<x<1$, $0<y<1$, and $0 \leq z \leq 0.05$: the NCM ternary cathode material nanorod has a cross-sectional diameter of 50 nm to 200 nm and a length of 0.1 μm to 5 μm; and a preparation method of the NCM ternary cathode material nanorod includes the following steps:

S1: mixing a mixed metal salt solution of nickel, cobalt, manganese, aluminum, and lithium with an alcohol solution of 8-hydroxyquinoline, and heating for reaction for a period of time to obtain a mixture; and adding an alkali liquor to the mixture to adjust a pH, further allowing a reaction for a period of time, and subjecting a resulting mixture to solid-liquid separation (SLS) to obtain a solid material, where the alkali liquor is at least one selected from the group consisting of sodium carbonate and potassium carbonate; and S2: subjecting the solid material to calcination under an aerobic condition to obtain the NCM ternary cathode material nanorod.

In some embodiments of the present disclosure, in S1, the mixed metal salt solution may be prepared by the following process: subjecting a waste ternary cathode material to acid leaching to obtain a leaching liquor, subjecting the leaching liquor to iron removal to obtain an iron-removed solution, and adjusting a molar ratio of metal ions in the iron-removed solution to obtain the mixed metal salt solution. The waste ternary cathode material is used as a raw material for preparing the ternary cathode material, which is directly from the battery recycling end to the cathode material end, involving a short process. In a traditional battery recycling process, a pH of a leaching liquor needs to be adjusted to a high value to remove iron and aluminum. In the present disclosure, only iron needs to be removed, which reduces the consumption of the alkali liquor; and aluminum is allowed to enter the subsequent cathode material as a doping element to improve the performance of the cathode material.

In some embodiments of the present disclosure, before the iron removal, an iron powder can also be added to the leaching liquor to remove copper.

In some preferred embodiments of the present disclosure, the iron removal may be conducted as follows: adjusting a pH of the leaching liquor to 3.2 to 3.5, and conducting SLS to obtain the iron-removed solution.

In some preferred embodiments of the present disclosure, a method for adjusting the molar ratio of metal ions in the iron-removed solution may include: at least one selected from the group consisting of the soluble salts of nickel, cobalt, manganese, aluminum, and lithium is added to the iron-removed solution, such that the molar ratio of the metal ions meets a requirement of a target product, that is, Li:Ni: Co:Mn:Al=1:(1-x-y-z):x:y:z. Further, the soluble salt may be at least one from the group consisting of a sulfate, a chloride, and an acetate.

In some embodiments of the present disclosure, in S1, a total concentration of metal ions in the mixed metal salt solution may be 0.1 mol/L to 1.0 mol/L.

In some embodiments of the present disclosure, in S1, the alcohol solution of 8-hydroxyquinoline may have a concentration of 0.3 mol/L to 0.6 mol/L.

In some preferred embodiments of the present disclosure, in S1, an alcohol in the alcohol solution of 8-hydroxyquinoline may be at least one selected from the group consisting of ethanol and ethylene glycol (EG).

In some embodiments of the present disclosure, in S1, a molar ratio of the total metal ions in the mixed metal salt solution to the 8-hydroxyquinoline in the alcohol solution of 8-hydroxyquinoline may be 2: (3-5).

In some embodiments of the present disclosure, in S1, the heating may be conducted at 50° C. to 70° C. Preferably, the heating for reaction may be conducted for 1 h to 2 h.

In some embodiments of the present disclosure, in S1, the pH may be 9 to 11. Preferably, the reaction after the sodium carbonate is added to adjust the pH may be conducted for 10 min to 30 min.

In some embodiments of the present disclosure, in S2, the calcination may be conducted at 700° C. to 950° C. Preferably, the calcination may be conducted for 4 h to 8 h.

In some embodiments of the present disclosure, S2 further comprises washing the solid material prior to the calcination, the washing may be conducted first with water and then with ethanol.

The present disclosure also provides a use of the NCM ternary cathode material nanorod described above in an LIB.

According to a preferred example of the present disclosure, the present disclosure at least has the following beneficial effects:

1. In the present disclosure, a mixed metal salt solution of nickel, cobalt, manganese, aluminum, and lithium is subjected to complexation and precipitation with 8-hydroxyquinoline to generate a precipitate containing nickel, cobalt, manganese, aluminum, and lithium, and then the precipitate is calcined to obtain the ternary cathode material nanorod. The whole process does not produce waste containing ammonia an nitrogen like a traditional process, and an alcohol used in the process can be directly recovered by evaporation and condensation, which is extremely environmentally friendly and harmless to personnel. The mixed metal salt solution of nickel, cobalt, manganese, aluminum, and lithium can be directly obtained by simply removing iron from an acid leaching liquor of a waste ternary lithium battery.

2. After a product obtained from the co-precipitation with 8-hydroxyquinoline is calcined, basically no impurities remain, and with the removal of 8-hydroxyquinoline, gaps in a crystal structure of the product are widened to generate pores, which is beneficial to the infiltration of an electrolyte and the transport of ions when the product is used as a cathode material, thereby greatly improving the electrochemical performance of the material.

3. In a traditional battery recycling process, a pH of a leaching liquor needs to be adjusted to a high value to remove iron and aluminum. In the present disclosure, only iron needs to be removed, which reduces the consumption of the alkali liquor; and aluminum is allowed to enter the subsequent cathode material as a doping element to improve the performance of the cathode material.

4. Compared with the traditional recycling process in which nickel and cobalt are extracted with an extracting agent such as P204 and P507, while manganese is abandoned, all valuable metals are recycled in the present disclosure.

BRIEF DESCRIPTION OF THE DRAWINGS

The drawings are used to provide a further understanding of the technical solution herein and form part of the description, and are used together with the examples of the present application to interpret the technical solution herein, and do not constitute a limitation on the technical solution herein. The present application is further described below in conjunction with the accompanying drawings and examples, wherein The sole figure is a scanning electron microscopy (SEM) image of the NCM ternary cathode material nanorod prepared in Example 1 of the present disclosure.

DETAILED DESCRIPTION

The concepts and technical effects of the present disclosure are clearly and completely described below in conjunction with embodiments, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

In this example, an NCM ternary cathode material nanorod was prepared, with a chemical formula of $LiNi_{0.33}Co_{0.33}Mn_{0.33}Al_{0.01}O_2$. The sole figure was an SEM image of the NCM ternary cathode material nanorod. The nanorod had a cross-sectional diameter of 80 nm to 100 nm and a length of 0.1 μm to 5 μm. A specific preparation process was as follows:

step 1: a leaching liquor obtained from acid leaching of a waste ternary LIB was subjected to iron removal to obtain an iron-removed solution, where a pH of the leaching liquor was adjusted to 3.2 to 3.5 for the iron removal, and aluminum was not removed;

step 2: soluble salts of nickel, cobalt, manganese, aluminum, and lithium were added to the iron-removed solution, such that a molar ratio of the metal ions met a requirement of a target product, that is, Li:Ni:Co:Mn:Al=1:0.33:0.33:0.33:0.01, where the soluble salts were chlorides, a mixed metal salt solution was obtained, and a total concentration of metal ions in the mixed metal salt solution was 0.3 mol/L;

step 3: an ethanol solution of 8-hydroxyquinoline with a concentration of 0.6 mol/L was prepared;

step 4: the mixed metal salt solution prepared in step 2 and the ethanol solution of 8-hydroxyquinoline prepared in step 3 were mixed (a molar ratio of total metal ions to 8-hydroxy quinoline was 2:3) to obtain a mixed solution;

step 5: the mixed solution was heated in a water bath to 70° C. and kept at the temperature for 1 h;

step 6: sodium carbonate was added to the mixed solution, a pH of the mixed solution was adjusted to 11, and a reaction was further conducted in the water bath for 10 min to obtain a mixture;

step 7: the mixture was subjected to SLS to obtain a solid material;

step 8: the solid material was washed first with pure water and then with ethanol;

step 9: the solid material was dried to obtain a dry material; and step 10: the dry material was calcined in an oxygen atmosphere at 950° C. for 4 h to obtain the NCM ternary cathode material nanorod.

Example 2

In this example, an NCM ternary cathode material nanorod was prepared, with a chemical formula of $LiNi_{0.5}Co_{0.2}Mn_{0.25}Al_{0.05}O_2$. The nanorod had a cross-sectional diameter of 50 nm to 80 nm and a length of 0.1 μm to 5 μm. A specific preparation process was as follows:

step 1: a leaching liquor obtained from acid leaching of a waste ternary LIB was subjected to iron removal to obtain an iron-removed solution, where a pH of the leaching liquor was adjusted to 3.2 to 3.5 for the iron removal, aluminum was not removed;

step 2: soluble salts of nickel, cobalt, manganese, aluminum, and lithium were added to the iron-removed solution, such that a molar ratio of metal ions met a requirement of a target product, that is, Li:Ni:Co:Mn:Al=1:0.5:0.2:0.25:0.05, where the soluble salts were acetates, a mixed metal salt solution was obtained, and a total concentration of metal ions in the mixed metal salt solution was 0.1 mol/L;

step 3: an EG solution of 8-hydroxyquinoline with a concentration of 0.3 mol/L was prepared;

step 4: the mixed metal salt solution prepared in step 2 and the EG solution of 8-hydroxyquinoline prepared in step 3 were mixed (a molar ratio of total metal ions to 8-hydroxy quinoline was 2:4) to obtain a mixed solution;

step 5: the mixed solution was heated in a water bath to 60° C. and kept at the temperature for 1.5 h;

step 6: sodium carbonate was added to the mixed solution, a pH of the mixed solution was adjusted to 10, and a reaction was further conducted in the water bath for 20 min to obtain a mixture;

step 7: the mixture was subjected to SLS to obtain a solid material;

step 8: the solid material was washed first with pure water and then with ethanol;

step 9: the solid material was dried to obtain a dry material; and step 10: the dry material was calcined in an air atmosphere at 850° C. for 6 h to obtain the NCM ternary cathode material nanorod.

Example 3

In this example, an NCM ternary cathode material nanorod was prepared, with a chemical formula of $LiNi_{0.8}Co_{0.1}Mn_{0.08}Al_{0.02}O_2$. The nanorod had a cross-sectional diameter of 150 nm to 200 nm and a length of 0.1 μm to 5 μm. A specific preparation process was as follows:

step 1: a leaching liquor obtained from acid leaching of a waste ternary LIB was subjected to iron removal to obtain an iron-removed solution, where a pH of the leaching liquor was adjusted to 3.2 to 3.5 for the iron removal, aluminum was not removed;

step 2: soluble salts of nickel, cobalt, manganese, aluminum, and lithium were added to the iron-removed solution, such that a molar ratio of the metal ions met a requirement of a target product, that is, Li:Ni:Co:Mn:Al=1:0.8:0.1:0.08:0.02, where the soluble salts were sulfates, a mixed metal salt solution was obtained, and a total concentration of the metal ions in the mixed metal salt solution was 1.0 mol/L;

step 3: an EG solution of 8-hydroxyquinoline with a concentration of 0.6 mol/L was prepared;

step 4: the mixed metal salt solution prepared in step 2 and the EG solution of 8-hydroxyquinoline prepared in step 3 were mixed (a molar ratio of total metal ions to 8-hydroxy quinoline was 2:5) to obtain a mixed solution;

step 5: the mixed solution was heated in a water bath to 50° C. and kept at the temperature for 2 h;

step 6: sodium carbonate was added to the mixed solution, a pH of the mixed solution was adjusted to 9, and a reaction was further conducted in the water bath for 30 min to obtain a mixture;

step 7: the mixture was subjected to SLS to obtain a solid material;

step 8: the solid material was washed first with pure water and then with ethanol;

step 9: the solid material was dried to obtain a dry material; and step 10: the dry material was calcined in an air or oxygen atmosphere at 700° C. for 8 h to obtain the ternary cathode material nanorod.

Test Example

The lithium nickel cobalt manganese oxide (LNCMO) products obtained in Examples 1 to 3 and commercially-available NCM333, NCM523, and NCM811 were each used as an LIB cathode material to assemble a button battery, which was subjected to an electrochemical performance test. Specifically, with N-methylpyrrolidone (NMP) as a solvent, a cathode active material, acetylene black, and polyvinylidene fluoride (PVDF) were thoroughly mixed in a mass ratio of 8:1:1, coated on an aluminum foil, blow-dried at 80° C. for 8 h, and then vacuum-dried at 120° C. for 12 h; and a battery was assembled in an argon-protected glove box, with a lithium sheet as a anode, a polypropylene (PP) membrane as a separator, and 1 M $LiPF_6$-EC/DMC (1:1, v/v) as an electrolyte. The test was conducted at a current density of 1 C=160 mA/g and a charge/discharge cut-off voltage of 2.7 V to 4.3 V. The cycling performance at a current density of 1 C was tested, and results were shown in Table 1.

TABLE 1

| Electrochemical performance of LNCMO | | | |
|---|---|---|---|
| | Discharge capacity at 0.1 C, mAh/g | Specific discharge capacity after 100 cycles, mAh/g | Cycling retention rate |
| Example 1 | 168 | 164.8 | 98% |
| Commercially-available NCM333 | 166 | 162.6 | 98% |
| Example 2 | 174 | 168.0 | 96.5% |
| Commercially-available NCM523 | 172 | 165.3 | 96.1% |
| Example 3 | 204 | 184.3 | 90.3% |
| Commercially-available NCM811 | 205 | 184.5 | 90% |

The present disclosure is described in detail with reference to the accompanying drawings and examples, but the present disclosure is not limited to the above examples. Within the scope of knowledge possessed by those of ordinary skill in the technical field, various changes can also be made without departing from the purpose of the present disclosure. In addition, the examples in the present disclosure and features in the examples may be combined with each other in a non-conflicting situation.

The invention claimed is:

1. A method for preparing a nickel-cobalt-manganese (NCM) ternary cathode material nanorod, wherein the NCM ternary cathode material nanorod has a chemical general formula of $LiNi_{1-x-y-z}Co_xMn_yAl_zO_2$, wherein 0<x<1, 0<y<1, and 0<z<0.05, the NCM ternary cathode material nanorod has a cross-sectional diameter of 50 nm to 200 nm and a length of 0.1 μm to 5 μm; and a preparation method of the NCM ternary cathode material nanorod comprises the following steps:

S1: mixing a mixed metal salt solution of nickel, cobalt, manganese, aluminum, and lithium with an alcohol solution of 8-hydroxyquinoline, and heating for reaction for a period of time to obtain a mixture; and adding an alkali liquor to the mixture to adjust a pH, further allowing a reaction for a period of time, and subjecting a resulting mixture to solid-liquid separation (SLS) to obtain a solid material, wherein the alkali liquor is at least one selected from the group consisting of sodium carbonate and potassium carbonate; and S2: subjecting the solid material to calcination under an aerobic condition to obtain the NCM ternary cathode material nanorod.

2. The method according to claim 1, wherein in S1, the mixed metal salt solution is prepared by the following process:

subjecting a waste ternary cathode material to acid leaching to obtain a leaching liquor, subjecting the leaching liquor to iron removal to obtain an iron-removed solution, and adjusting a molar ratio of metal ions in the iron-removed solution to obtain the mixed metal salt solution.

3. The method according to claim 2, wherein a method for the adjusting a molar ratio of metal ions in the iron-removed solution comprises: at least one selected from the group consisting of soluble salts of nickel, cobalt, manganese, aluminum, and lithium is added to the iron-removed solution, such that the molar ratio of the metal ions meets a requirement of a target product, that is, Li:Ni:Co:Mn:Al=1: (1-x-y -z):x:y:z.

4. The method according to claim 1, wherein in S1, a total concentration of metal ions in the mixed metal salt solution is 0.1 mol/L to 1.0 mol/L.

5. The method according to claim 1, wherein in S1, the alcohol solution of 8-hydroxyquinoline has a concentration of 0.3 mol/L to 0.6 mol/L.

6. The method according to claim 1, wherein in S1, a molar ratio of the total metal ions in the mixed metal salt solution to the 8-hydroxyquinoline in the alcohol solution of 8-hydroxyquinoline is 2:(3-5).

7. The method according to claim 1, wherein in S1, the heating is conducted at 50° C. to 70° C.

8. The method according to claim 1, wherein in S1, the pH is 9 to 11.

9. The method according to claim 1, wherein in S2, the calcination is conducted at 700° C. to 950° C.

\* \* \* \* \*